C. HADDAD
INVENTOR.

BY E.C. McRae
J.B. Faulkner
J.H. Oster

ATTORNEYS

Feb. 13, 1962     C. HADDAD     3,021,151
MOTOR VEHICLE AIR SUSPENSION SYSTEM AND FLOW
RATE CONTROL VALVE

Filed April 12, 1957     2 Sheets-Sheet 2

C. HADDAD
*INVENTOR.*

BY *E. C. McRae*
*J. C. Faulkner*
*T. H. Oster*

ATTORNEYS

United States Patent Office 3,021,151
Patented Feb. 13, 1962

3,021,151
MOTOR VEHICLE AIR SUSPENSION SYSTEM AND FLOW RATE CONTROL VALVE
Charles Haddad, Detroit, Mich., assignor to Ford Motor Company, Dearborn, Mich., a corporation of Delaware
Filed Apr. 12, 1957, Ser. No. 652,554
15 Claims. (Cl. 280—124)

This invention relates generally to an air suspension system for a motor vehicle and particularly to the leveling mechanism for the system.

An object of the invention is to provide an air suspension system for a motor vehicle incorporating leveling mechanism automatically maintaining a predetermined relationship between the vehicle chassis and the road wheels regardless of the load on the vehicle. A further object is to provide, in a system of this type, leveling mechanism in which the filling and exhausting of the air springs may be selectively effected at different air flow rates.

Reference is made to the co-pending application of Henry T. Szostak and George A. Bigham for a Motor Vehicle Air Suspension System filed March 7, 1957, Serial No. 644,622, and now Patent No. 2,925,284, Feb. 16, 1960. In this co-pending application a control valve provides air flow at a relatively slow rate in one position of the valve and at a faster rate in another position of the valve. The control valve is actuated by air pressure supplied through a control conduit, while a second conduit provides air for filling the air springs. In the present invention, only a single conduit is required to provide air for the air springs and to actuate the control valve. In an embodiment of the invention this is accomplished by providing pressure regulator means arranged to supply air pressure at two different pressures through the single conduit, with the control valve means being regulated by the pressure differential.

Other objects and advantages of this invention will be made more apparent as this description proceeds, particularly when considered in connection with the accompanying drawings, wherein.

Figure 1:
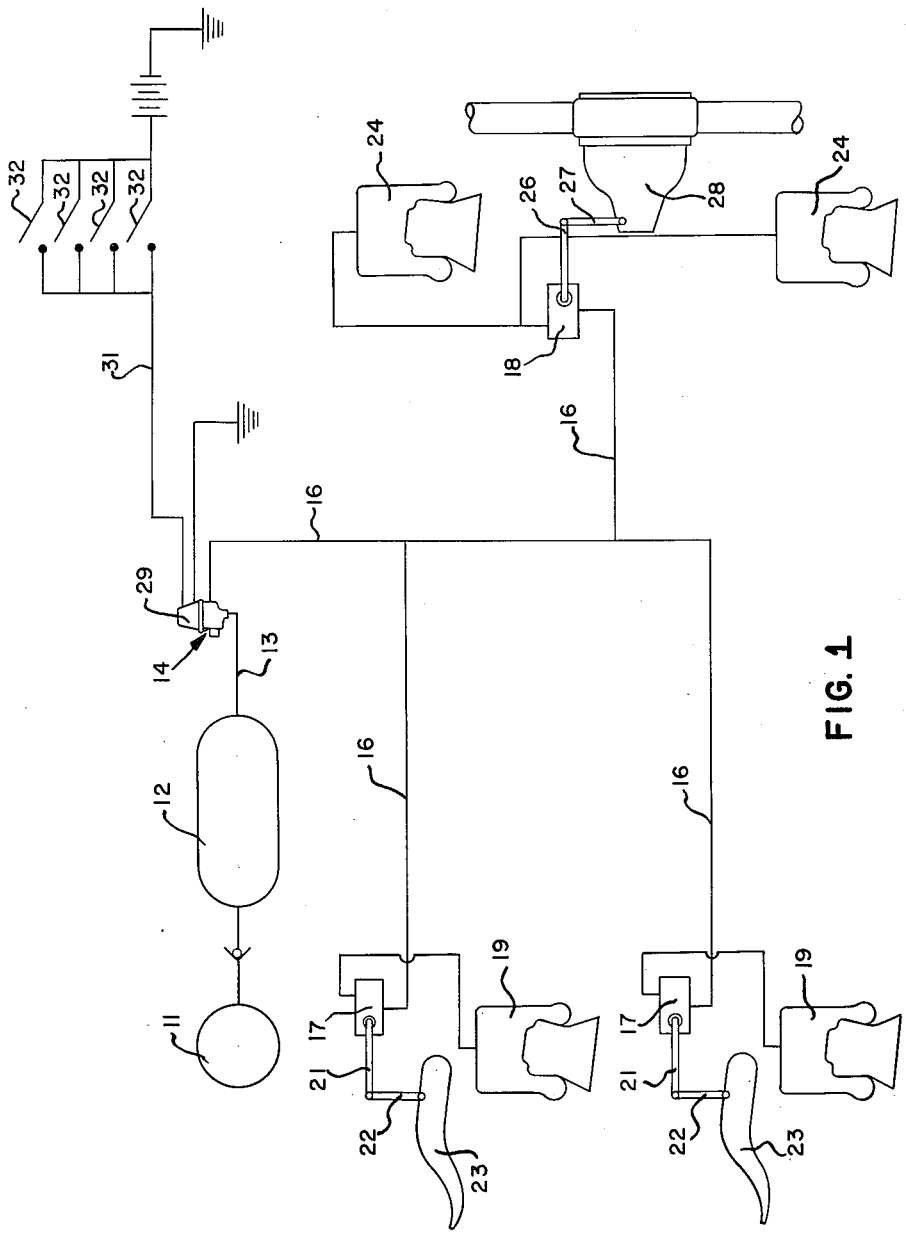
FIGURE 1 is a diagrammatic view of the air suspension system of the present invention.

Referring now to the drawings and particularly to FIGURE 1, the reference character 11 indicates generally an air compressor adapted to charge an air storage tank 12. The storage tank 12 is connected by a conduit 13 to a solenoid operated regulator valve 14. The regulator valve is connected by means of conduits 16 to a pair of front leveling valves 17 and a central rear leveling valve 18.

The front leveling valves 17 control the supply of air to, and the exhausting of air from, front air springs 19 conventionally mounted between the vehicle frame and a lower front suspension member (not shown). Each front leveling valve 17 is connected by means of an arm 21 and a link 22 to an upper suspension arm 23 so that the leveling valve will be responsive to changes in the relationship between the vehicle frame and the road wheels.

The rear leveling valve 18 is connected to a pair of rear air springs 24 mounted between the vehicle frame and rear suspension members (not shown). The rear leveling valve is connected by means of an arm 26 and a link 27 to the rear axle housing 28 to be responsive to variations in the relationship between the vehicle frame and the rear road wheels.

The regulator valve 14 is adapted to supply air to the leveling valves at different pressures depending upon whether or not the solenoid 29 of the valve is energized. Energization of the solenoid 29 is controlled by an electric circuit 31 incorporating a plurality of switches 32 arranged in parallel. Each switch 32 is associated with a vehicle door, and if desired, may be the existing courtesy light switch which normally functions to turn on a light when the door is opened. It will be seen that whenever a door is opened, one of the switches 32 will be closed to energize the solenoid 29.

Figure 2:
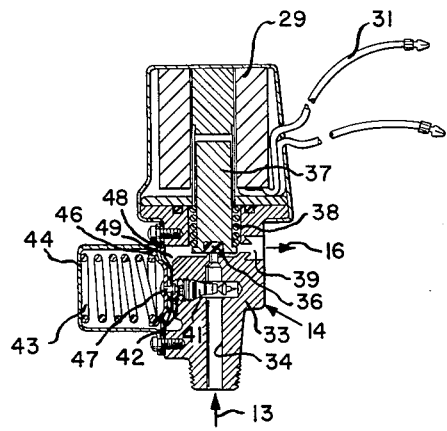
FIGURE 2 is an enlarged cross sectional view of the regulator valve shown in FIGURE 1.

Referring now to FIGURE 2, it will be seen that the regulator valve 14 comprises a valve body 33 having a passageway 34 therein connected to the conduit 13 from the air storage tank 12. The upper end of the passageway 34 is adapted to be closed by a valve member 36 carried at the lower end of a plunger 37 forming a reciprocable core for the solenoid 29 which is mounted upon the upper end of the valve body 33. It will be seen that when the solenoid 29 is energized by the circuit 31, the plunger 37 will be raised against its return spring 38 to lift the valve member 36 from its seat and permit unimpeded flow of air from the conduit 13 through the vertical passageway 34 and the cross passageway 39 to the conduit 16 leading to the leveling valves and the air springs. Thus, when the solenoid 29 is energized by the opening of any door of the vehicle, the leveling valves will be supplied with air at the pressure of the air storage tank 12. This pressure may, for example, be in the order of 300 p.s.i.

When all vehicle doors are closed, the solenoid 29 will be deenergized and the valve 36 held in the closed position shown by the spring 38. Under these conditions, air flow through the regulator valve 14 from the conduit 13 to the conduit 16 must be effected through the air valve 41 mounted in a cross passageway 42 in the valve body. This valve is similar to the conventional valve core used in automative tires. The stem of the valve 41 is urged toward an open position by means of a coil spring 43 mounted in a cap 44 and acting through a spring retainer 46 and a central actuating pin 47. The pin 47 also secures the spring retainer to a flexible diaphragm 48, closing the enlarged chamber 49 which establishes communication between the cross passageways 39 and 42 of the valve body. With the valve 41 thus being held open by the spring 43, air may flow through the valve into the chamber 49 and the passageway 39 to the leveling valve. When this pressure builds up to a predetermined value, the pressure in chamber 49 will overcome the spring 43 moving the diaphragm 48 and the pin 47 to the left to close the valve 41. Thus, air is supplied to the leveling valves through the conduit 16 at a predetermined pressure which is considerably lower than the pressure in the air supply tank 12. When the vehicle doors are all closed, this pressure, for example, may be in the order of 130 p.s.i., as compared to the storage tank pressure of 300 p.s.i., and will be maintained at approximately that value by the regulator valve 14.

Figure 3:
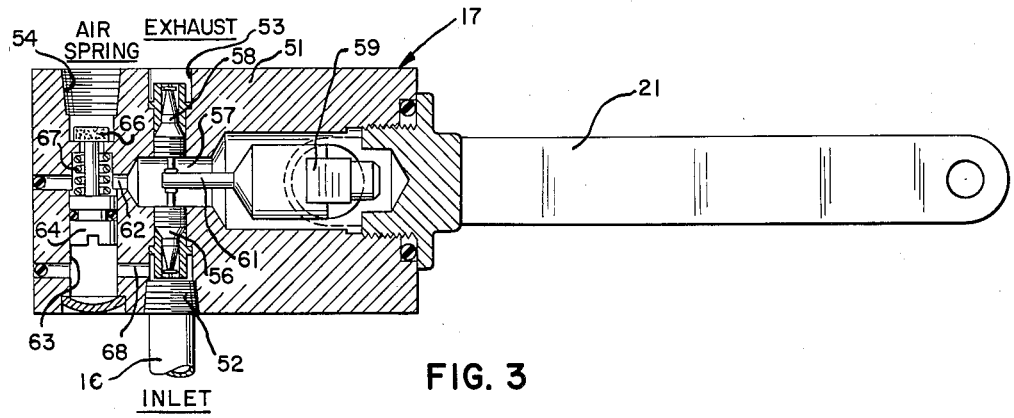
FIGURE 3 is en enlarged cross sectional view through the leveling and control valve means shown in FIGURE 1.

The leveling valves 17 and 18 are similar, and only one will be described in detail. Referring now to FIGURE 3, it will be seen that each leveling valve 17 comprises a valve housing 51 having an inlet port 52 connected to the air supply conduit 16, an outlet port 53 connected to atmosphere, and a port 54 connected to the adjacent air spring.

The valve housing 51 is provided with an inlet valve 56 controlling communication between the inlet port 52 and a central chamber 57 and an outlet valve 58 controlling communication between the central chamber 57 and the exhaust port 53. These valves are normally held in closed position, but may be opened by the arm 21 which is pivotally mounted upon the valve body at 59 and which has an extension 61 projecting into the chamber 57 between the stems of the inlet and outlet valves 56 and 58 respectively.

The chamber 57 communicates by means of a passageway 62 with a cross bore 63 formed in the valve housing. A reciprocable control valve 64 is mounted in the bore 63 and has a head 66 normally held in seated position by means of a spring 67.

The head 66 of the control valve 64 is of sintered bronze or porous ceramic to permit air flow therethrough at a relatively slow rate even when the valve is closed. The control valve is adapted to be opened against the return spring 67 by air pressure supplied to the bore 63 from the supply conduit 16 through a cross passageway 68 whenever the pressure therein is sufficient to overcome the spring 67.

The operation of the system is as follows:

With the vehicle doors closed and the switches 32 open, the regulator valve 29 is deenergized and the regulator valve held in the position shown in FIGURE 2 in which air is supplied to the supply conduit 16 at the lower of the two pressures (e.g. 130 p.s.i.). This pressure acts upon the control valve 64 (FIGURE 3) but is not sufficient to move the valve against the spring 67. Consequently, the head 66 of the control valve is seated, and air flow between the air spring and the central valve chamber 57 may occur only at the slow rate permitted by the porous valve head 66. Any leveling called for at this time by reason of the relationship between the vehicle frame and the road wheel will therefore be at a relatively slow rate.

Thus it will be seen that air supplied through the inlet valve 56 to the air spring, or air exhausted from the air spring through the outlet valve 58 to atmosphere, must be through the porous head of the control valve, so that continuous leveling at a slow rate is provided to slowly correct any improper car attitude.

When any door is opened, one of the switches 32 will be closed to energize the solenoid 29 and open the valve 36 of the regulator valve 14 to furnish air to the supply conduit 16 at the higher of the two pressures determined by the regulator valve. In the embodiment shown, this higher pressure corresponds to the pressure in the air storage tank 12 (e.g. 300 p.s.i.). This higher pressure acts upon the control valve 64 and is sufficient to overcome the return spring 67 and lift the valve head 66 from its seat, thus permitting a free air flow therethrough. Any leveling called for by the ingress or egress of passengers or other change in the vehicle loading, may thus be accomplished rapidly due to the faster air flow thus permitted when a vehicle door is opened. Usually this leveling may be completed before the vehicle doors are all closed. Should the leveling not be completed or should it be improper for some reason, the leveling may continue at the slow rate through the porous valve head 66 after the doors are closed.

In the present embodiment, the control valve is mounted in the same valve housing as the inlet and outlet leveling valves 56 and 58 and is located in series with these leveling valves and between the valves and the air spring. The control valve could, of course, be located elsewhere in the supply conduit between the regulator valve and the air spring. It will be apparent that with this construction, a single air supply line suffices to provide air to the air springs to fill the latter and also to actuate the control valve which governs the rate of air flow to and from the air spring. The control valve actuation is accomplished by the pressure differential between the two pressures supplied to the supply conduit under different circumstances. While the pressure differential is established in the present instance by vehicle door position, it might also be established by other controls or vehicle components.

Figure 4:
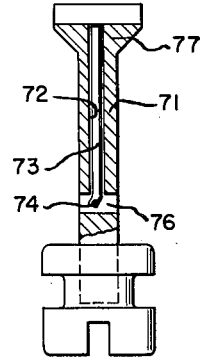
FIGURE 4 is a cross sectional view of a modified control valve.

FIGURE 4 illustrates a modified control valve 71 which may be used in lieu of the valve 64 shown in FIGURE 3. The valve 71 has a central passageway 72 restricted by the positioning therein of a wire core 73 slightly smaller in diameter than the diameter of the passageway. During assembly, the lower end 74 of the wire core is bent into a cross passageway 76 to retain the core in position. With this arrangement it will be seen that a continuous slow air flow is permitted through the space between the passageway 72 and the core 73 whenever the control pressure is insufficient to open the valve. When the pressure is increased sufficiently to overcome the valve return spring, the head 77 of the valve is lifted from its seat to provide a relatively fast air flow.

It will be understood that the invention is not to be limited to the exact construction shown and described, but that various changes and modifications may be made without departing from the spirit and scope of the invention, as defined in the appended claims.

What is claimed is:

1. In a motor vehicle having a chassis member resiliently supported upon a wheel member by means of an air spring, and a source of air under pressure for said air spring, leveling valve means responsive to variations in the relationship between said members to control the flow of air from said air source to said air spring and from said air spring to exhaust, control valve means in series with said leveling valve means to vary the rate of air flow to and from said air spring between a slow rate and a faster rate, a single conduit connecting said control valve means and said leveling valve means to said air source, and means for varying the pressure in said conduit between a lower and a higher pressure to shift said control valve means between said slow rate position and said faster rate position.

2. In a motor vehicle having a sprung and an unsprung member, an air spring resiliently connecting said members, a source of air pressure for said air spring, leveling valve means responsive to variations in the relationship between said members to control the flow of air to and from said air spring, control valve means controlling the rate of air flow to and from said air spring, said control valve means being shiftable between a first position permitting a relatively slow air flow rate and a second position permitting a faster air flow rate, a single conduit from said air source to said leveling valve means and said control valve means, and a regulator valve for regulating the pressure in said conduit between two different pressures, one of said pressures determining one of said control valve positions and the other of said pressures determining the other of said control valve positions.

3. The structure defined by claim 2 which is further characterized in that the higher of said regulated pressures determines the control valve position for the faster air flow rate and the lower of said regulated pressures determines the control valve position for the relatively slow air flow rate.

4. The structure defined by claim 2 which is further characterized in that the higher of said regulated pressures corresponds to the pressure of said air source and determines said second position of said control valve and the lower of said regulated pressures is considerably lower than said air source pressure and determines said first position of said control valve.

5. The structure defined by claim 2 which is further characterized in that said leveling valve means and said air spring are connected by a conduit, and said control valve means is interposed in said last mentioned conduit to control the rate of air flow between said leveling valve means and said air spring.

6. The structure defined by claim 1 which is further characterized in that said means comprises a pressure regulator valve for selectively reducing the pressure supplied by said air source to said conduit, said flow control valve being responsive to the change in pressure to vary the air flow rate.

7. In a motor vehicle having a road wheel, an air spring for said road wheel, a source of air pressure, a supply conduit between said air source and said air spring for supplying air under pressure to said air spring, a control valve in said supply conduit for controlling the flow of air from said air source to said air spring shiftable between a first position permitting a relatively slow air flow rate and a second position permitting a faster air flow rate, and means for varying the pressure in said supply conduit between lower and higher positive pressure values, said control valve being responsive to the pressure in said supply conduit to permit said relatively slow air flow rate at one of said pressure values and said faster air flow rate at the other of said pressure values.

8. In a motor vehicle having a chassis and a road wheel, an air spring for said road wheel, a source of air pressure, a control valve shiftable between two positions for controlling the flow of air from said air source to said air spring at two different flow rates, a pressure regulator valve connected to said air source, a leveling valve responsive to variations in the relationship between said chassis and said road wheel, a single conduit connecting said regulator valve to said control valve and said leveling valve, and actuating means for said regulator valve to selectively vary the pressure in said conduit to shift said control valve between said two positions to vary the air flow rate to said air spring.

9. In a motor vehicle having a road wheel, an air spring for said road wheel, a source of air pressure, a control valve shiftable between two positions for controlling the flow of air from said air source to said air spring at two different flow rates, a pressure regulator valve connected to said air source, a conduit between said regulator valve and said control valve, a solenoid for actuating said regulator valve to selectively vary the pressure in said conduit to shift said control valve between said two positions to vary the air flow rate to said air spring, and a vehicle door controlled switch for controlling the energization of said solenoid.

10. In a motor vehicle having a road wheel, an air spring for said road wheel, a source of air pressure, a conduit between said air source and said air spring, a control valve in said conduit, spring means biasing said valve towards seated position, means permitting air flow at a slow rate to said air spring when said valve is in said seated position, and means for varying the pressure in said conduit between a lower and a higher pressure, said lower pressure being insufficient to overcome said valve spring so that said valve remains seated, and said higher pressure being sufficient to overcome said valve spring and unseat said valve to permit air flow to said air spring at a faster rate.

11. In a motor vehicle having a sprung and an unsprung member, an air spring resiliently connecting said members, a source of air pressure for said air spring, a valve housing mounted upon one of said members and having an inlet port connected to said air source and an outlet port connected to said air spring, a leveling valve in said housing between said ports, actuating means for said leveling valve responsive to variations in the relationship between said members, a control valve in said housing between said ports in series with said leveling valve, spring means biasing said control valve toward seated position; means permitting air flow at a slow rate to said air spring when said leveling valve is open and said control valve is seated, said control valve having a portion exposed to the pressure in said inlet port, and means for varying the pressure at said inlet port between a higher and a lower pressure, said lower pressure being insufficient to unseat said control valve, and said higher pressure being sufficient to unseat said control valve to permit air flow to said air spring at a faster rate when said leveling valve is opened.

12. In a motor vehicle having a chassis member resiliently supported upon a wheel member by means of an air spring, and a source of air under pressure for said air spring, leveling valve means responsive to variations in the relationship between said members to control the flow of air from said air source to said air spring and from said air spring to exhaust, control valve means in series with said leveling valve means to vary the rate of air flow to and from said air spring, a conduit connecting said control valve means to said air source, a regulator valve regulating the pressure in said conduit between two different pressures, said regulator valve being operated by a solenoid responsive to the opening of a door of said motor vehicle to effect a change in the rate of filling and exhausting said air spring whenever said door is opened.

13. In a motor vehicle having a road wheel, an air spring for said road wheel, a source of air pressure, a conduit between said air source and said air spring, a control valve in said conduit shiftable between a first position permitting air flow to said air spring at a slow rate and a second position permitting air flow to said air spring at a faster rate, spring means biasing said valve to one of said positions, and means for varying the pressure in said conduit between a lower and a higher pressure, said lower pressure being insufficient to overcome said valve spring so that said valve remains in said one position, and said higher pressure being sufficient to overcome said valve spring and move said valve to the other of said positions.

14. In a motor vehicle having a sprung and an unsprung member, an air spring resiliently connecting said members, a source of air pressure for said air spring, a leveling valve having connections to said air pressure source, to exhaust and to said air spring, actuating means for said leveling valve responsive to variations in the relationship between said members to control the flow of air to and from said air spring, a control valve in series with said leveling valve in the connection between said leveling valve and said air spring, said control valve being shiftable between a first position permitting air flow at a slow rate and a second position permitting air flow at a faster rate, spring means biasing said valve to one of said positions, and means for varying the pressure in the connection between said air pressure source and said leveling valve between a lower and a higher pressure, said lower pressure being insufficient to overcome said valve spring so that said valve remains in said one position, and said higher pressure being sufficient to overcome said valve spring and move said valve to the other of said positions.

15. In a motor vehicle having a chassis member resiliently supported upon a wheel member by means of an air spring, and a source of air under pressure for said air spring, leveling valve means responsive to variations in the relationship between said members to control the flow of air from said air source to said air spring and from said air spring to exhaust, control valve means in series with said leveling valve means and shiftable between a first position permitting air flow to and from said air spring at a slow rate and a second position permitting air flow to and from said air spring at a faster rate, a conduit connecting said control valve means to said air source, and a regulator valve regulating the pressure in said conduit between a lower and a higher pressure, the lower pressure positioning said control valve means in one of said positions and the higher pressure positioning said control valve means in the other of said positions to permit the filling and exhausting of said air spring at two different rates.

References Cited in the file of this patent
UNITED STATES PATENTS

| | | |
|---|---|---|
| 820,707 | Downer | May 15, 1906 |
| 955,059 | Duncan | Apr. 12, 1910 |
| 1,666,748 | Mickley | Apr. 17, 1928 |
| 2,787,475 | Jackson | Apr. 2, 1957 |